(12) United States Patent
Löffert et al.

(10) Patent No.: US 6,308,133 B1
(45) Date of Patent: Oct. 23, 2001

(54) ADAPTIVE NAVIGATION SYSTEM

(75) Inventors: Ralf Löffert, Wiesbaden; Bernhard Troedel, Solms, both of (DE)

(73) Assignee: Mannessmann VDO AG, Frankfurt am Main (DE)

( * ) Notice: Subject to any disclaimer, the term of this patent is extended or adjusted under 35 U.S.C. 154(b) by 0 days.

(21) Appl. No.: 09/448,731

(22) Filed: Nov. 24, 1999

(30) Foreign Application Priority Data

Nov. 25, 1998 (DE) .................................. 198 54 399

(51) Int. Cl.7 ............................................ G06F 7/00
(52) U.S. Cl. ..................... 701/211; 701/36; 701/208; 340/995
(58) Field of Search ......................... 701/35, 36, 200, 701/207, 208, 211; 340/988, 995

(56) References Cited

U.S. PATENT DOCUMENTS 5,184,303   2/1993   Link .
5,528,501   6/1996   Hanson .

FOREIGN PATENT DOCUMENTS

| 40 33 574 A1 | 5/1991 | (DE) . |
| 41 06 405 A1 | 9/1991 | (DE) . |
| 4211556 A1 | 10/1993 | (DE) . |
| 19535576 A1 | 4/1996 | (DE) . |
| 0582081 A | 2/1994 | (EP) . |
| 08-044387 | 2/1996 | (JP) . |

*Primary Examiner*—William A. Cuchlinski, Jr.
*Assistant Examiner*—Edward Pipala
(74) *Attorney, Agent, or Firm*—Mayer, Brown & Platt

(57) ABSTRACT

The invention relates to a navigation system for a land vehicle having a measurement arrangement for supplying position, direction and/or distance data, having a data source arrangement for supplying navigation data, having an input arrangement at least for inputting a destination point, having a control arrangement at least for determining a route, and having at least one display apparatus for outputting navigation instructions. After receiving data from an identification sensor, the control arrangement uses stored data to determine the driver who is operating the land vehicle and outputs navigation instructions, matched to the driver, in predetermined regions or on predetermined routes.

9 Claims, 1 Drawing Sheet

ADAPTIVE NAVIGATION SYSTEM

BACKGROUND OF THE INVENTION

1. Field of the Invention

The invention relates to a navigation system for a land vehicle having a measurement arrangement for supplying position, direction and/or distance data, having a data source arrangement for supplying navigation data, having an input arrangement at least for inputting a destination point, having a control arrangement at least for determining a route, and having at least one display apparatus for outputting navigation instructions.

2. Description of Related Art

The navigation system mentioned above is known from the document Funkschau 20, 1997, pages 70 to 73, "Verkehrsfunk auf Abruf" [Traffic radio on demand]. Digitally coded navigation instructions are supplied from a CD-ROM to a control arrangement which is designed, for example, with a microprocessor. The navigation system uses position data from a GPS system (GPS=Global Positioning System) and the directional data from a gyrocompass to determine position details relating to the vehicle's location. After inputting a destination point, the navigation system guides a driver to this destination point, by audible and visual outputs, after calculating the position of the vehicle and the route to be traveled. In the process, traffic information supplied from an RDS-TMC receiver is also taken into account, in order to indicate, for example, diversion routes. Such a system allows the driver to drive to a destination that he does not know, without any local knowledge and without reading road maps.

SUMMARY OF THE INVENTION

The purposes and advantages of the invention will be set forth in and apparent from the description and drawing that follow, as well as will be learned by practice of the invention. Additional advantages of the invention will be realized and attained by the elements of the navigation system particularly pointed out in the appended claims.

The invention is based on the object of providing a navigation system which allows a driver's local knowledge to be taken into account.

The object is achieved by a navigation system of the type mentioned initially in that, after receiving data from an identification sensor, the control arrangement is provided in order to determine from stored data the driver who is operating the land vehicle, and in that the control arrangement is provided for outputting navigation instructions, matched to the driver, in predetermined regions or on predetermined routes.

According to the invention, the driver is given navigation instructions which are individually matched. In regions or on routes in which or on which the driver has local knowledge it is thus possible to give no navigation instructions, or only few navigation instructions. Setting data for a driver are stored in the control arrangement for specific regions and indicate the navigation instructions that the driver wishes to receive. In contrast to known navigation systems, the invention avoids unnecessary navigation instructions. This improves road safety, since the driver is distracted less.

The driver is determined via an identification sensor. A voice identification device of a voice input system of the input arrangement, an automatic seat adjustment apparatus for the land vehicle or a key identification apparatus for the land vehicle may form such an identification sensor. An identification sensor may likewise be formed by a keypad or a trackball of the input arrangement.

The control arrangement contains a module for driver identification, which module uses data supplied from the identification sensor to determine from stored data the driver who is operating the vehicle and which, after the driver has input a destination, uses stored settings to check whether the driver requires few navigation instructions, or no navigation instructions whatsoever, in specific regions or on a route to the destination. After being input via the input arrangement, the settings for a driver are stored in the control arrangement. The control arrangement can also contain a learning module which stores the routes driven and stores the setting for a frequently used route such that no navigation instructions or few navigation instructions are output for this route.

After receiving specific traffic information via the data source arrangement which relates to the region or the route for which the driver does not want any navigation instructions or wants few navigation instructions, the control arrangement is provided to output precise navigation instructions.

BRIEF DESCRIPTION OF THE DRAWING

An exemplary embodiment of the invention will be explained in more detail in the following text with reference to FIG. 1, which shows a block diagram of a navigation system for land vehicles.

DETAILED DESCRIPTION OF THE INVENTION

Figure 1:
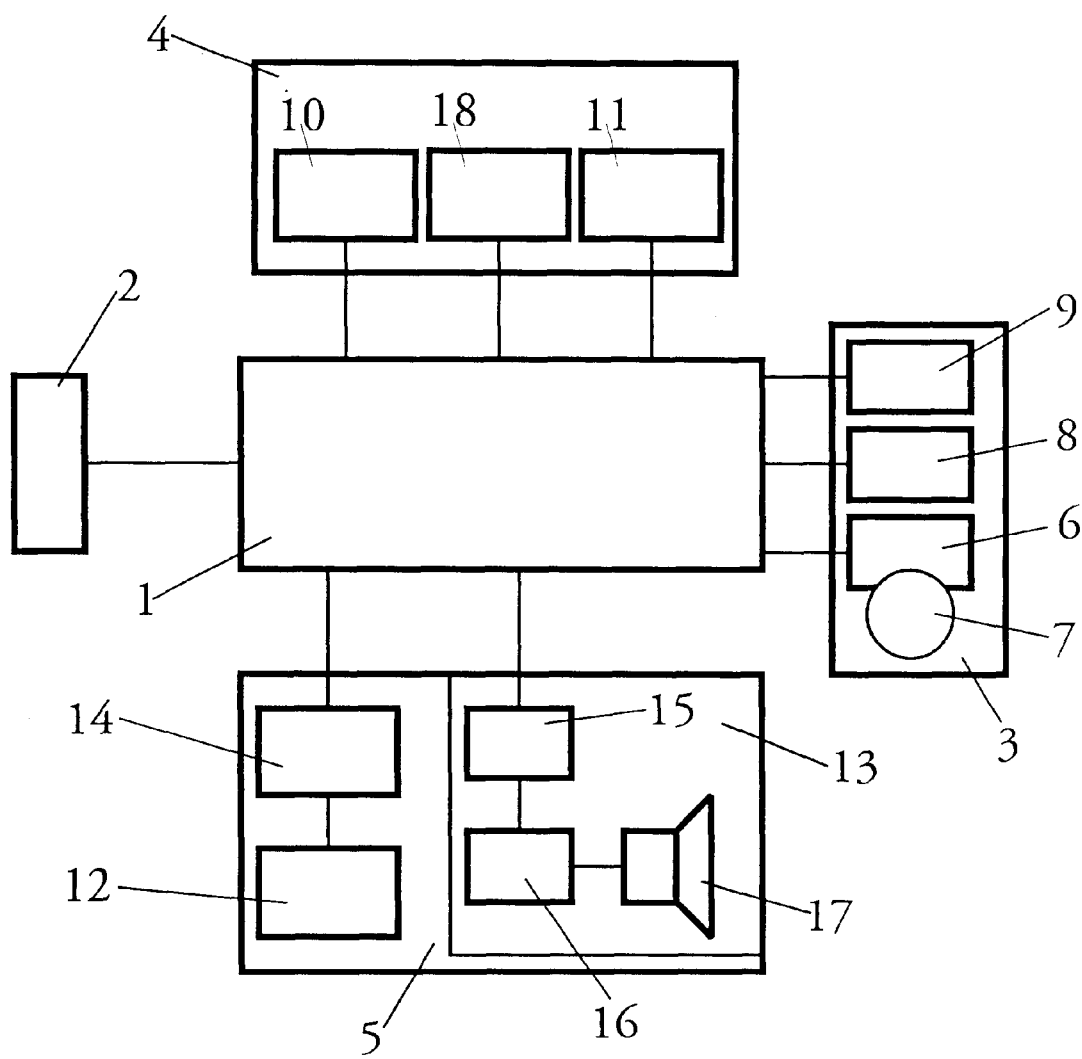
FIG. 1 is incorporated in and constitutes a part of this specification.

FIG. 1 shows a block diagram of an exemplary embodiment of a navigation system for land vehicles. The navigation system contains a control arrangement 1, a measurement arrangement 2, a data source arrangement 3, an input arrangement 4 and an output arrangement 5. The control arrangement 1 may contain, for example, a microprocessor which, inter alia, carries out the navigation calculations and is coupled to at least one read only memory (ROM), for example for executing a program, and to a random access memory (RAM) for storing data during operation.

The measurement arrangement 2 supplies the control arrangement 1 with data and contains, for example, a tachometer, an electronic compass and a GPS receiving unit (GPS=Global Positioning System); The measurement arrangement may also contain wheel sensors, which supply the control arrangement 1 with direction and distance data from the left-hand and right-hand front or rear wheel of the vehicle. Otherwise, the direction and distance data are determined from the signals emitted from the tachometer and the electronic compass. The GPS receiving unit uses received satellite data to calculate the present position of the vehicle, and passes the calculated position data on to the control arrangement 1. Such position data supplied from the GPS receiving unit have an inaccuracy of up to 100 meters.

The data source arrangement 3 contains at least one apparatus for supplying digitally coded navigation data from a navigation data memory to the control arrangement 1. This apparatus may be, for example, a CD-ROM drive 6, which takes data for a specific area (e.g. Germany) from a CD-ROM 7 (navigation data memory). Furthermore, the data source arrangement 3 may contain an RDS-TMC receiver 8 (RDS=Radio Data System, TMC=Traffic Message Channel) or a GSM module 9 (GSM=Global System for Mobile Communication), which receive digitally coded traffic messages and pass them on to the control arrangement 1. The GSM module may also be used to make telephone calls.

The input arrangement 4 contains a keypad 10 and, possibly, a trackball 11. A user may make manual inputs via the keypad 10 and/or the trackball 11. The keypad 10 may in this case also be part of a remote control. The inputs made by a user (e.g. driver) of the navigation system via the input arrangement 4 are also supplied to the control arrangement 1. The input arrangement 4 may also contain a voice input system 18, which contains a microphone with a downstream audio signal processing circuit and a voice identification arrangement. The identified voice inputs are likewise supplied to the control arrangement 1. The voice identification arrangement may also be part of the control arrangement 1.

The output arrangement 5 has a display apparatus 12 and a voice output circuit 13. A drive circuit 14, which is likewise contained in the output arrangement 5, is also used to drive the display apparatus 12. A voice synthesis circuit 15, an amplifier 16 and a loudspeaker 17, for example, are also part of the voice output circuit 13.

The control arrangement 1 determines a route between at least two points (start point and destination point). Before the journey, the user (e.g. driver) must enter at least the destination point via the input arrangement 4. Such input data are, as a rule, also output from the output arrangement 5 for user monitoring. During the journey, the driver is provided with audible or visual indications from the control arrangement 1, by means of the output arrangement 5. The control arrangement 1 uses various software modules, for example to carry out route planning and to give instructions. On the basis of the data (position, direction and distance data) supplied from the measurement apparatus 2, and on the basis of the data supplied from the data source arrangement 3, the control arrangement 1 uses a position-finding software module to calculate the respective position of the vehicle at the start of and during the journey. A further route planning module in each case calculates the route to be driven to the respective destination point, on the basis of the position point and the destination point output from the position-finding software module. In this case, it is also possible to take account of traffic messages supplied, for example, from the RDS-TMC receiver 8 or the GSM module 9 in order, for example, to instruct the driver to bypass a traffic jam. A software module for route instructions receives the respective position point from the position-finding software module, various route instructions from the route-planning software module and, possibly, also navigation data from the data source arrangement 3. The software module for route instructions produces control data for the voice output, and to display instructions visually. It is also possible to display a section of a map on the display apparatus 12, together with the respective position details.

The navigation system shown in FIG. 1 is also used to identify the driver who is using the vehicle, in order to output individual navigation instructions, matched to the driver, for predetermined regions or for predetermined routes. In this case, a module for driver identification in the control arrangement 1 evaluates data which are supplied from an identification sensor which characterizes a driver. Such an identification sensor, which supplies the control arrangement 1 with information about the driver, may be the voice identification device of the voice input system 18, an automatic seat adjustment apparatus, a key identification apparatus or the keypad 10 or the trackball 11 after a manual input by the driver.

The voice identification apparatus supplies, for example, a voice input to the module for driver identification. The module for driver identification compares specific voice input features, in order to identify the respective driver. The seat adjustment apparatus, which is not shown in any more detail in FIG. 1, sets a seat position for a driver on the basis of stored adjustment data. Such adjustment data are, for example, selected manually via a key by the respective driver. This key input, which identifies a driver, is supplied to the module for driver identification in the control arrangement 1. Furthermore, the driver may also be identified by a key identification apparatus. In this case, each key has individual features which identify a driver, and are detected by the key identification apparatus. These features may be transmitted, for example, inductively from the key to the key identification apparatus. The fourth driver identification option mentioned above is provided by the keypad 10 or the trackball 11. For example, the driver enters a specific word which identifies him (for example a password) via the keypad 10 or the trackball 11, or selects the corresponding driver from a list of drivers displayed on the display apparatus 12. This keypad input or trackball input is evaluated by the driver identification module.

Once the driver has entered the destination point, the control arrangement 1 outputs navigation instructions for predetermined regions or for predetermined routes, these navigation instructions being dependent on settings stored for the driver for said predetermined regions or predetermined routes. For example, settings are stored for a driver relating to the regions in which or the routes on which he has local knowledge. Furthermore, it is possible to store as a setting whether any announcements should be made by the voice output circuit 13 or any indications on the display apparatus 12 at all or at what frequency, in the known regions or on the known routes. For example, for the region around Wetzlar in which one driver has local knowledge, the simple statement "to the A3 South" could be made after the start of the journey if the driver's start point is, for example, in Wetzlar and the destination point is in Wurzburg. Thus, with the driver having local knowledge in this example, only the simple direction is announced. If the driver has no local knowledge, the navigation system will indicate the exact route.

The settings for a driver may be entered, for example, by said driver manually via the keypad 10, the trackball 11 or the voice input system 18. These settings may in this case be entered and stored for a specific journey, for example by entering a destination point or, in general, for all journeys in a region. Furthermore, the driver can also indicate the regions in which he requires no navigation instructions or few navigation instructions, and the regions in which he requires precise navigation instructions.

The settings may also in each case be produced by the control arrangement 1 itself, by means of a learning module. Thus, for example, the various routes for a driver can be stored in the control arrangement 1 and, if a driver uses a route relatively frequently, the control arrangement 1 identifies this and reduces or avoids the navigation instructions for this route which is traveled frequently.

If traffic information is received via the RDS-TMC receiver 8 or via the GSM module 9, relating to the region or the route in which or on which the driver does not want any navigation instructions or wants few traffic instructions, precise navigation instructions are once again output, for example, in the event of a traffic jam, fog, someone driving on the wrong carriageway etc. in the known region or on the known route.

Other embodiments of the invention will be apparent to those skilled in the art from consideration of the specification and practice of the invention disclosed herein. It is intended that the specification and examples of embodiments be considered as exemplary only, with the true scope and spirit of the invention being indicated by the following claims.

What is claimed is:

1. A navigation system for a land vehicle comprising:

an identification sensor that produces data, a measurement arrangement for supplying position, direction and distance data, a data source arrangement for supplying navigation data, an input arrangement at least for inputting a destination point, at least one display apparatus for outputting navigation instructions, and a control arrangement at least for determine a route wherein, the control arrangement includes stored data, determines a driver who is operating the land vehicle from the stored data and the data from the identification sensor, determines navigation instructions matched to the driver for predetermined regions or for predetermined routes.

2. The navigation system as claimed in claim 1, wherein the input arrangement includes a voice input system, wherein the voice input system includes a voice identification device, and the identification sensor comprises the voice identification device.

3. The navigation system as claimed in claim 1, wherein the identification sensor comprises an automatic seat adjustment apparatus for the land vehicle.

4. The navigation system as claimed in claim 2, wherein the identification sensor comprises a key identification apparatus for the land vehicle.

5. The navigation system as claimed in claim 2, wherein the input arrangement includes a keypad or a trackball and the identification sensor comprises either the keypad or the trackball.

6. The navigation system as claimed in claim 1, wherein the control arrangement further comprises:

settings, a module for driver identification, which module determines a driver that has inputted a destination using the data from the identification sensor and the stored data, determines whether the driver requires few navigation instructions, or no navigation instructions whatsoever, in specific regions or on route to the destination, using the settings.

7. The navigation system as claimed in claim 6, wherein, after being input via the input arrangement, the settings are stored in the control arrangement.

8. The navigation system as claimed in claim 6, wherein the control arrangement further comprises a learning module which stores at least one route driven by the driver and stores the setting for at least one frequently used route such that no navigation instructions or few navigation instructions are output for these routes for the driver.

9. The navigation system as claimed in claim 6, wherein, after receiving specific traffic information via the data source arrangement which relates to the region or the route for which the driver does not want any navigation instructions or wants few navigation instructions, the control arrangement outputs precise navigation instructions.

* * * * *